Figure 1:
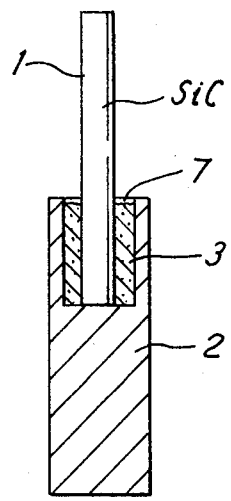

United States Patent [19]

Andersen

[11] Patent Number: 4,699,762

[45] Date of Patent: Oct. 13, 1987

[54] METHOD FOR CONNECTING REACTION-SINTERED SILICON CARBIDE PARTS WITH IRON- OR METAL PARTS, AND EMBODIMENT OF AN IONIZATION ELECTRODE ACCORDING TO THE METHOD

[75] Inventor: Niels L. Andersen, Nordborg, Denmark

[73] Assignee: Danfoss A/S, Nordborg, Denmark

[21] Appl. No.: 803,427

[22] Filed: Dec. 2, 1985

Related U.S. Application Data

[63] Continuation of Ser. No. 335,685, Dec. 30, 1981, abandoned.

[51] Int. Cl.[4] .................................................. B22F 7/00
[52] U.S. Cl. ........................................ 419/9; 156/294; 156/296; 419/5; 419/17; 428/558; 428/564; 428/565; 428/389; 428/397; 428/398
[58] Field of Search ................. 419/5, 9, 17; 428/558, 428/564, 565, 389, 397, 398; 156/294, 296

[56] References Cited

U.S. PATENT DOCUMENTS

| | | | |
|---|---|---|---|
| 1,814,878 | 7/1931 | Weed | 428/558 |
| 2,390,160 | 12/1945 | Marvin | 419/9 |
| 2,750,658 | 6/1956 | Went et al. | 428/558 |
| 3,168,399 | 2/1965 | Takahashi et al. | 419/5 |
| 3,976,434 | 8/1976 | Shwayder | 428/558 |

Primary Examiner—Stephen J. Lechert, Jr.
Attorney, Agent, or Firm—Wayne B. Easton; Clayton R. Johnson

[57] ABSTRACT

The invention relates to a method for connecting reaction sintered silicon carbide parts to iron and other metal parts of importance is that the connection involves the use of a binder comprising a mixture of silicon and a metal and preferably it is a eutectic mixture.

11 Claims, 7 Drawing Figures

METHOD FOR CONNECTING REACTION-SINTERED SILICON CARBIDE PARTS WITH IRON- OR METAL PARTS, AND EMBODIMENT OF AN IONIZATION ELECTRODE ACCORDING TO THE METHOD

The invention relates to a method for connecting reaction-sintered silicon carbide parts with iron- or metal parts.

Contacting of ceramic semiconductor parts of the silicon carbide type has always given problems. Among the already known methods for making electrical and mechanical contact can be mentioned flame-sprayed metal connections or shrunk-on metal connections. When high temperatures are applied, e.g. temperatures of 600°–700° C., the flame-sprayed metal may be burnt away, and other connections, such as shrunk-on metal connections, may become mechanically unstable because of the high-temperature heating stresses.

The invention relates to specification of a method for reliable and heat-resistant connection of metallic parts with silicon carbide parts.

According to the invention the silicon carbide part is fastened to the metal- or iron part by means of a binder of silicon and a metal, with subsequent heating of the connection.

Preferably, the binder should be a eutectic mixture of silicon and the metal used, e.g. iron. This ensures a thermally stable mechanical and electrical connection between the silicon carbide part and the iron part.

Use of an ionisation electrode for flame monitoring in oil- and gas burners is already known. Such electrodes are based on the already known principle that the electrode, e.g. an iron electrode, is inserted in the flame area, causing the flame to ionise the gap between the fuel nozzle of the burner and the electrode, permitting conduction of an electric current. In blue-flame burners from which no visible light is emitted, an ultraviolet-detector has been used. Often, however, such a detector cannot be used, e.g. when the burner is surrounded by a recirculation chamber. In such burners an ionisation electrode is therefore preferred, but such electrode has the drawback that the material is disintegrated so that the electrode has a relatively short life at the very high flame temperature which is in blue-flame burners normally around 1,400°–1,500° C.

Therefore, the invention also relates to specification of a more resistant electrode. According to the invention this is obtained when the electrode is rod-shaped and when at least the part to the rod protruding into the flame consists of a reaction-sintered silicon carbide semiconductor material.

Preferably, the semiconductor material should be of such an extent that the connection to the metallic part is mostly outside the flame area. The fragility of the end of the electrode points towards the electrode being kept as short as possible. On the other hand, the high temperature causes problems with the connection to the metal part of the electrode. Even immediately outside the flame the connection will be exposed to a high temperature of about 600°–700° C. At such temperatures the method according to the invention is particularly suitable for connecting the metal part of the ionisation electrode with the silicon carbide rod. By fastening, according to claim 1 of the invention, the end of the electrode in the metallic part by means of a binder of silicon and iron, preferably a eutectic mixture of silicon and iron, we shall get a durable electrode. The eutectic mixture will enter into connection with both the silicon carbide rod and the iron part.

The connection proper can be made by placing the silicon carbide rod in a hole in an iron rod and by putting a mixture of silicon powder and iron powder into the space between the silicon carbide rod and the iron rod, and then heating the unit to more than 1,200° C. The mixture may e.g. be in the proportion of 1:1. Through this, the silicon- and the iron powder will form a eutectic mixture which will enter into connection with the silicon carbide rod and the iron part.

The sintered-on metal part may possibly completely enclose the silicon carbide rod. This gives a mechanically stable unit which is easy to handle, the sintered shell protecting the rather fragile ceramic silicon carbide rod. Of course, the sintered metal part which is exposed to the flame will disintegrate but will leave a residue enclosing the stable silicon carbide rod in the area a short distance from the flame, in which area the temperature is not higher than 700°–800° C. Therefore, the only part corroding will be the one which is directly in the high-temperature part of the flame.

Further, the metal electrode outside the sintered part may be weakened so that the fragile tip of the electrode can be bent to a desired position without damage to the fragile part.

Another method is to push in a metal part covering at least the end of the silicon carbide rod and to concrete the two parts through heating to a temperature of 1,100° C. The sintering results in kind of shrinking, and at the same time an intimate mechanical and electrical connection is obtained in the junction, constant also at high temperatures. If the temperature is raised to more than 1,200° C., this method will also give a eutectic mixture which ensures an even stabler junction and good electric connection.

The resulting unit is hard-soldered, welded or otherwise fastened to the parts of the electrode leading out of the flame zone.

Preferably, the metallic part should be pressure-sintered on, possibly through isostatic pressure. This will give a very close and thorough connection of the sintered-on metal part.

Figure 2:
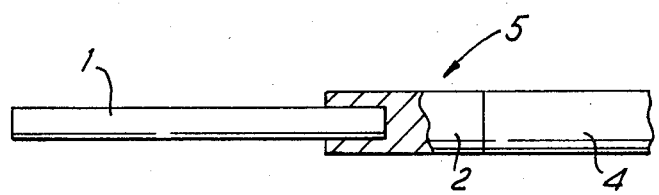
Figure 3:
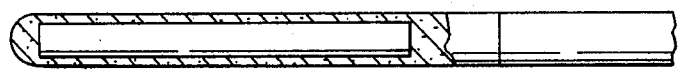
Figure 4:
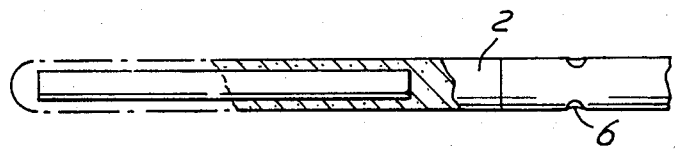
Figure 5:
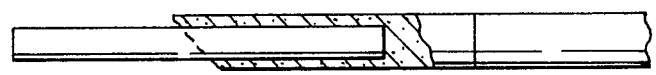
Figure 6A:
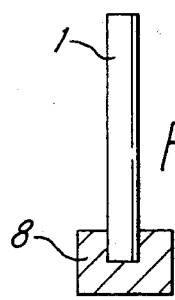
Figure 6B:
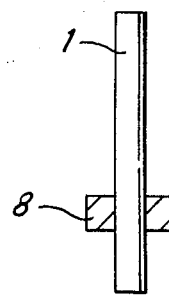

The invention is specified below in preferred embodiments, illustrated in the drawings showing in FIG. 1 an ionisation electrode with a silicon carbide rod inserted in an iron-holder;

FIG. 2 the finished electrode according to the method illustrated in FIG. 1;

FIG. 3 ionisation sensor in which the silicon carbide rod is completely enclosed in sintered-on metal material;

FIGS. 4 and 5 the sensor shown in FIG. 3 after having been used for some time and FIG. 6 2 embodiments, a and b, of a silicon carbide rod with a sintered-on and shrunk metal part.

A ceramic silicon carbide rod is made in the already known way, preferably by reaction-sintering of a mixture of silicon carbide (SiC) and graphite with liqiuid silicon (Si) at a high temperature, through which free graphite reacts with silicon into silicon carbide. FIG. 1 illustrates how such a silicon carbide part 1 can, according to the invention, be connected to a metallic electrode part 2 of iron. The silicon carbide rod is placed in a bore 7 in the iron rod. The space between the bore and the rod is filled with a mixture 3 of silicon- and iron powder, e.g. in the proportion of 1:1. Instead, the space may be filled with a pre-prepared powder consisting of a mixture of silicon and iron, e.g. a eutectic mixture. All the unit with the ceramic rod is now heated to more than 1,200° C., at which temperature the powder mixture will form a eutectic mixture and enter into connection with both the silicon carbide rod and the iron. Also other metal compounds may be used as binder, e.g. a mixture of silicon and nickel.

FIG. 2 shows the finished electride tip 1, 2, made by the method illustrated in FIG. 1. The iron part 2 of the silicon carbide rod forms an intermediate part which can now be fastened as desired to the rest 4 of the electrode rod 5.

FIG. 3 illustrates a method by which iron powder is pressed around a silicon carbide rod, e.g. by isostatic pressing, i.e. pressing with application of the same pressure from all sides. All the unit is then heated to about 1,200° C., preferably to 1,200°-1,220° C., throughout which the iron powder will concrete, and at the same time silicon from the silicon carbide rod will diffuse into the iron powder, forming a eutectic mixture which forms a thermically stable mechanical and electrical connection between the silicon carbide rod and the iron powder. The latter electrode is sturdier and stands transport and handling better than the rod illustrated in FIGS. 1 and 2.

As illustrated in FIGS. 4 and 5 the part of the metal shell protruding into the flame will slowly be corroded off, and only the stable silicon carbide rod will remain.

FIG. 4 further illustrates how the rod 4 behind the intermediate part 2 of the ceramic silicon carbide rod 1 can be made with weakenings 6 which may either, as desired, be made all around the rod or be made only in part of the circumference. This enables suitable adaptation of the tilt of the silicon carbide rod in proportion to the rest of the electrode by simple manual bending in the weakening, without damage to the fragile ceramic outer part. Also other embodiments of the electrode can be made with such weakenings.

FIG. 6 illustrates in two embodiments, a and b, how a metal part 8, here an annular part, has been shrunk and sintered on to the silicon carbide rod.

Many other embodiments and methods for pressing and sintering of the parts are conceivable, but they will all be covered by the invention idea of the present application.

What we claim is:

1. A method of making an electrode that in part is extendable into a high temperature flame that normally is in the range of about 1400°-1500° C. for ionization flame monitoring purposes in oil and gas burners, comprising providing an axially elongated reaction-sintered silicon carbide rod that is extendable into the flame and an iron part having a bore therein, placing the silicon carbide rod to extend into the bore, filling the space in the bore between the iron part and the silicon carbide rod with a powdered mixture of iron and silicon carbide, and heating the rod, iron part and powdered mixture to a sufficiently high temperature that the powdered mixture will form a thermically mechanically stable and electrical sintered connection between the silicon rod and iron part for having the silicon carbide rod extended into the high temperature flame.

2. The method according to claim 1 wherein said mixture is an eutectic mixture of silicon and iron.

3. The method according to claim 1 wherein the heating step comprises heating to more than 1200° C.

4. An electrode according to claim 1 wherein the silicon carbide rod is of a length that during use the sintered connection is located primarily outside of the flame area and is exposed to a temperature of about 600°-700° C.

5. The electrode according to claim 4 wherein the iron part is an iron rod having the bore in one end portion thereof.

6. The electrode according to claim 7 wherein the iron rod is provided with a weaken portion to permit bending the iron rod without damaging the silicon carbide rod.

7. A method of making an electrode that in part is extendable into a high temperature that normally is in the rage of about 1400°-1500° C. for ionization flame monitoring purposes in oil and gas burners, comprising providing an axially elongated silicon carbide rod, encasing the silicon carbide rod with powdered iron that is in contact with the silicon carbide rod and then heating the powdered iron and silicon carbide rod to a sufficiently high temperature that the silicon from the silicon carbide rod will diffuse into the the iron powder and sinter the iron powder to form a sintered-on iron part connected to and surrounding the silicon carbide rod that will corrode off the part of the silicon carbide rod protruding into the flame.

8. The method of claim 7 wherein the step of encasing the iron rod comprises pressing the iron powder through isostatic pressure.

9. A method of making an electrode for ionization flame monitoring in gas and oil burners wherein the temperature immediately outside the flame is of a temperature of about 600°-700° C. comprising providing an iron part having a bore therein and an elongated silicon carbide rod, placing the silicon carbide rod to extend into said bore, applying a mixture of silicon powder and iron or nickel powder within the bore between the silicon carbide rod and iron part, and heating the mixture to a sufficiently high temperature for fastening the silicon carbide rod to the iron part whereby the silicon carbide rod is adapted for being extended into same flame and the iron part is adapted for being located primarily outside of the flame.

10. The method of claim 9 wherein the iron part is an iron rod having the bore in one end portion thereof and the silicon carbide rod has one end portion extended into the bore with the rods adapted for being to have their end portions located immediately outside the flame, and that the applying step comprises filling the space in said bore between the silicon carbide rod end portion and iron rod with said mixture to surround the silicon carbide rod end portion.

11. A method of making an electrode for ionization flame monitoring in gas and oil burners wherein the flame temperature is normally about 1400°-1500° C., comprising providing an elongated silicon carbide rod, encasing the silicon carbide rod in an iron powder that is in contact with the rod and then heating the powdered iron and silicon carbide rod to a sufficiently high temperature that the silicon from the silicon crbide rod will diffuse into the iron powder to form a sintered-on iron part connected to and encasing the silicon rod and positioning the encased silicon rod to have one end portion thereof extend into the flame and the other end portion thereof located outside of the flame whereby the sintered-on iron will slowly corrode off the one end portion of the silicon carbide rod while remaining on the other end portion which is outside of the flame.

* * * * *